(12) United States Patent
Faibish et al.

(10) Patent No.: US 8,972,465 B1
(45) Date of Patent: Mar. 3, 2015

(54) BURST BUFFER APPLIANCE WITH SMALL FILE AGGREGATION

(71) Applicant: EMC Corporation, Hopkinton, MA (US)

(72) Inventors: Sorin Faibish, Newton, MA (US); John M. Bent, Los Alamos, NM (US)

(73) Assignee: EMC Corporation, Hopkinton, MA (US)

( * ) Notice: Subject to any disclaimer, the term of this patent is extended or adjusted under 35 U.S.C. 154(b) by 239 days.

(21) Appl. No.: 13/840,274

(22) Filed: Mar. 15, 2013

(51) Int. Cl.
*G06F 17/30* (2006.01)

(52) U.S. Cl.
CPC .............................. *G06F 17/30091* (2013.01)
USPC .......................................................... 707/822

(58) Field of Classification Search
USPC ......................................... 707/609, 822, 823
See application file for complete search history.

(56) References Cited

U.S. PATENT DOCUMENTS

| | | | |
|---|---|---|---|
| 8,825,652 B1 * | 9/2014 | Faibish et al. ................. | 707/737 |
| 2004/0133606 A1 * | 7/2004 | Miloushev et al. ............ | 707/200 |
| 2004/0133652 A1 * | 7/2004 | Miloushev et al. ............ | 709/214 |
| 2004/0153451 A1 * | 8/2004 | Phillips et al. .................... | 707/8 |
| 2006/0200470 A1 * | 9/2006 | Lacapra et al. .................. | 707/10 |
| 2009/0106255 A1 * | 4/2009 | Lacapra et al. .................. | 707/10 |
| 2009/0112831 A1 * | 4/2009 | Gupta et al. ....................... | 707/4 |
| 2010/0235366 A1 * | 9/2010 | Andrew et al. ................. | 707/752 |
| 2010/0306267 A1 * | 12/2010 | Zamkoff et al. ............... | 707/783 |
| 2012/0154404 A1 * | 6/2012 | Clement et al. ............... | 345/440 |
| 2013/0182628 A1 * | 7/2013 | Gholmieh et al. ............ | 370/312 |

OTHER PUBLICATIONS

J. Bent et al., "PLFS: A Checkpoint Filesystem for Parallel Applications," ACM/IEEE Conference on High Performance Computing Networking, Storage and Analysis, SC09, Nov. 2009, 12 pages, Article No. 21.

* cited by examiner

*Primary Examiner* — Cam-Linh Nguyen
(74) *Attorney, Agent, or Firm* — Ryan, Mason & Lewis, LLP

(57) ABSTRACT

A burst buffer appliance is adapted for coupling between a computer system and a file system. The burst buffer appliance comprises a flash memory or other high-speed memory having a substantially lower access time than the file system, and an analytics engine, and is configured to aggregate multiple data files having a size below a designated threshold into a container having at least one associated metadata file for processing by the analytics engine. The burst buffer appliance directs storage of the container in the file system. The analytics engine is configured to generate at least a content-based portion of the one or more metadata files of the container based at least in part on content of one or more of the multiple data files so as to permit one or more subsequent processing operations to be performed using the metadata file(s) rather than the corresponding multiple data files.

18 Claims, 7 Drawing Sheets

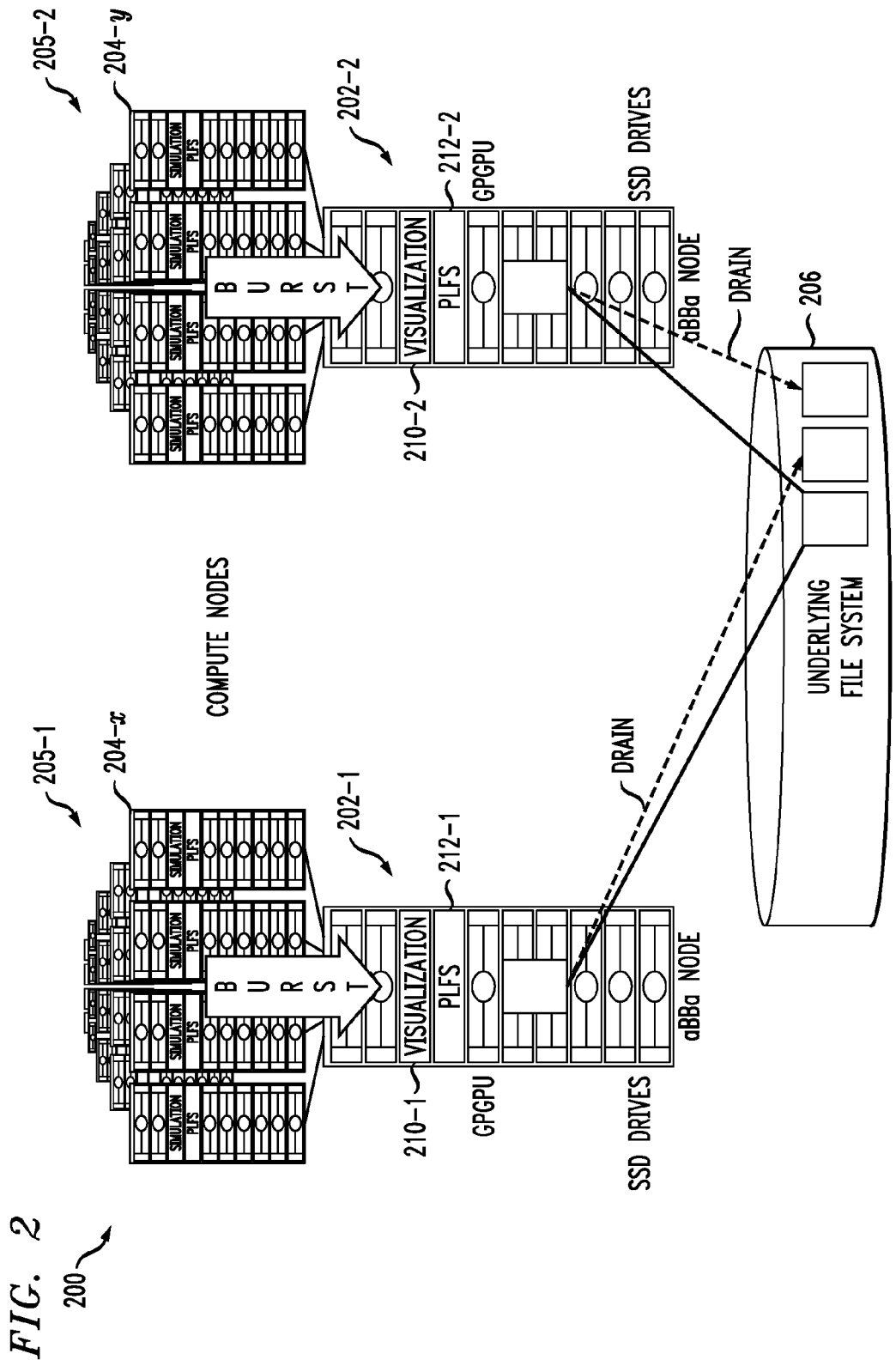

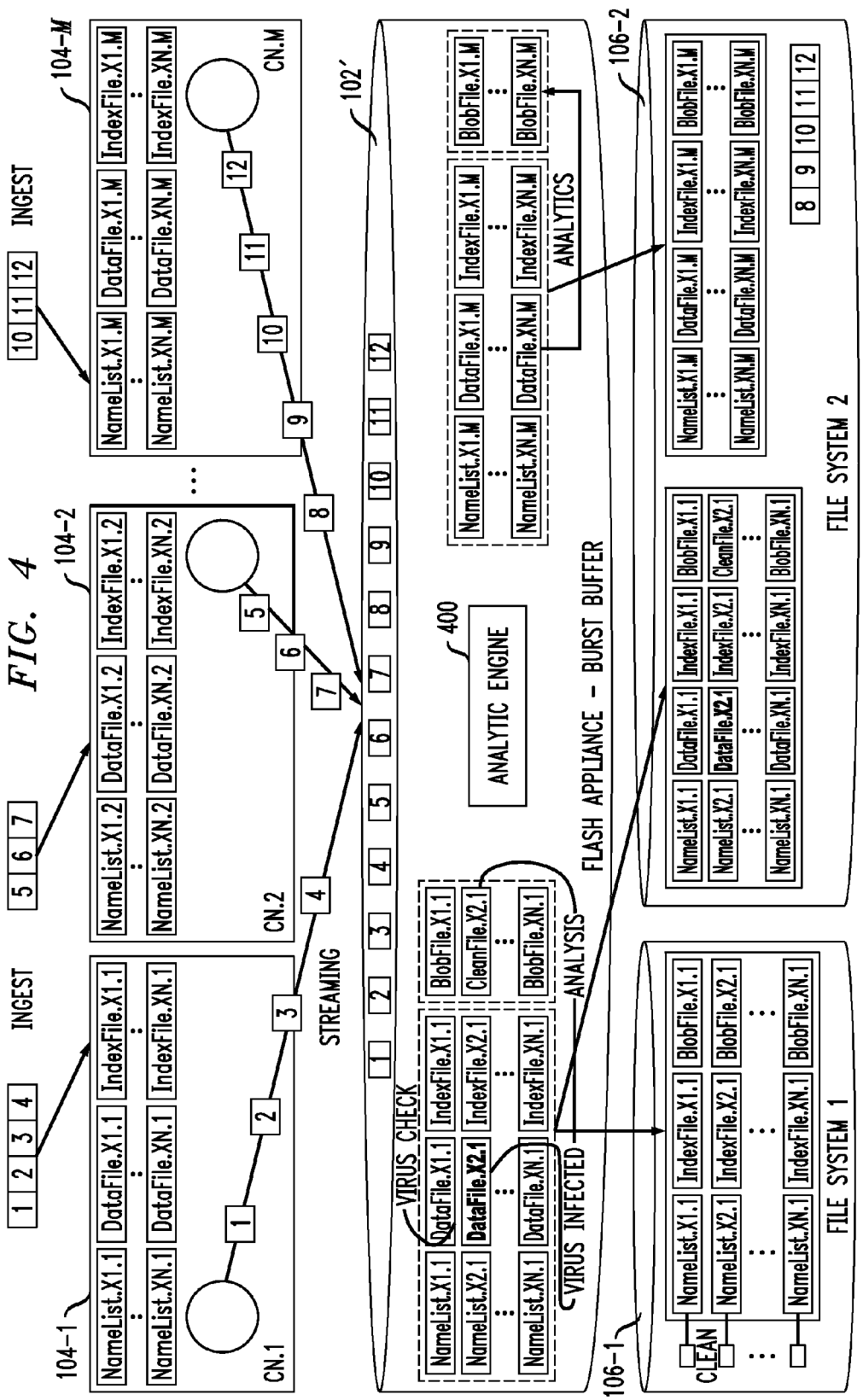

US 8,972,465 B1

BURST BUFFER APPLIANCE WITH SMALL FILE AGGREGATION

FIELD

The field relates generally to information processing systems, and more particularly to information processing systems in which multiple compute nodes share a file system.

BACKGROUND

It is common in high-performance computing environments and other information processing system applications for multiple compute nodes to access a shared file system. For example, high-performance computer systems such as supercomputers typically include large numbers of compute nodes that access a parallel file system, distributed file system or other type of cluster file system. A cluster file system as the term is broadly used herein generally allows multiple client devices to share access to files over a network.

Well-known examples of cluster file systems include the Lustre file system and distributed file systems such as Hadoop Distributed File System (HDFS). These and other file systems utilized by high-performance computer systems can readily scale to support tens of thousands of clients, petabytes of storage, and hundreds of gigabytes per second of aggregate input-output (IO) throughput.

A problem that arises in these and other information processing system applications relates to the handling of small data files generated by processes running on the various compute nodes. If a large number of such data files are generated substantially concurrently by multiple compute nodes, an excessive number of accesses to the file system may be required, thereby undermining the IO throughput performance.

SUMMARY

Illustrative embodiments of the present invention provide improved handling of small data files in information processing systems, using a burst buffer appliance arranged between a computer system and a parallel file system or other type of file system. The computer system may comprise a supercomputer or other type of high-performance computer system having a large number of compute nodes, or more generally any arrangement of multiple compute nodes that share the file system.

In one embodiment, a burst buffer appliance is adapted for coupling between a computer system and a file system. The burst buffer appliance comprises a flash memory or other high-speed memory having a substantially lower access time than the file system, and an analytics engine. The burst buffer appliance is configured to aggregate multiple data files having a size below a designated threshold into a container having at least one associated metadata file for processing by the analytics engine. The burst buffer appliance directs storage of the container in the file system.

By way of example, the analytics engine of the burst buffer appliance may be configured to generate at least a content-based portion of one or more metadata files of the container based at least in part on content of one or more of the multiple data files so as to permit one or more subsequent processing operations to be performed using the one or more metadata files rather than the corresponding multiple data files.

As a more particular illustration, the content-based portion of the one or more metadata files in a given embodiment of the invention may identify one or more of the multiple data files that are determined to be infected with a virus using a virus checking operation performed by the analytics engine. In other embodiments, the content-based portion of the one or more metadata files may identify one or more results of a map reduce operation performed on the multiple data files by the analytics engine, or one or more keys determined to be associated with the multiple data files by the analytics engine.

The burst buffer appliance may be utilized to implement a virtual layer of a parallel log-structured file system. Numerous other types of file systems and burst buffer appliance configurations can be used in other embodiments.

One or more of the illustrative embodiments described herein exhibit enhanced performance relative to conventional arrangements. For example, these embodiments provide increased processing efficiency for small data files that could otherwise significantly undermine the IO throughput performance of the system.

BRIEF DESCRIPTION OF THE DRAWINGS

FIG. 2 shows another embodiment of an information processing system comprising multiple burst buffer appliances.

FIGS. 4 and 5 illustrate the use of the container structure of FIG. 3A in performing respective virus checking operations and map reduce operations in the FIG. 1 system.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
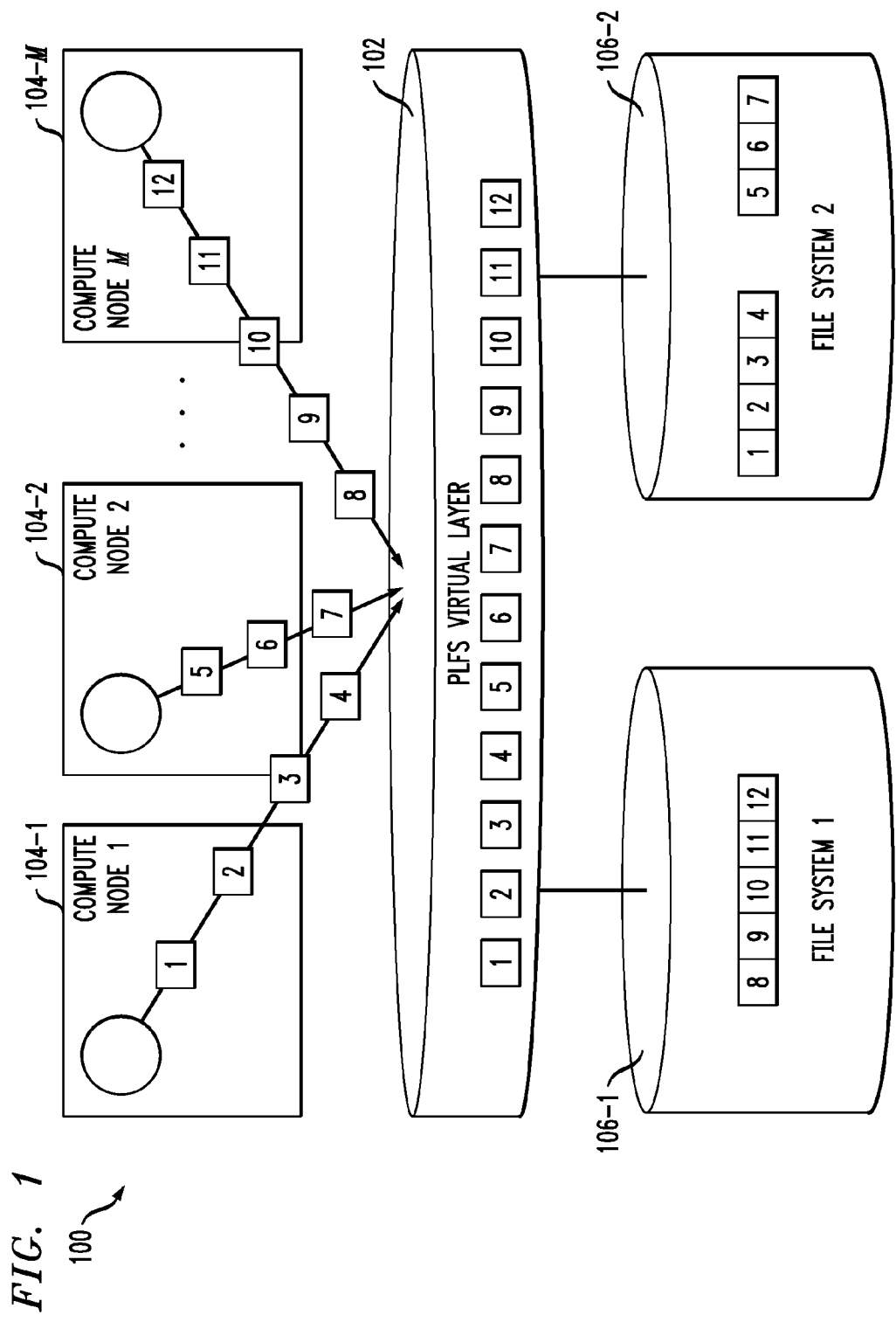
FIG. 1 is a block diagram of an information processing system comprising a burst buffer appliance that implements small file aggregation with content-based metadata in an illustrative embodiment of the invention.

FIG. 1 shows an information processing system 100 configured in accordance with an illustrative embodiment of the present invention. The information processing system 100 comprises a burst buffer appliance 102 and a plurality of compute nodes 104-1, 104-2, . . . 104-M. The compute nodes 104 may be collectively viewed as an example of a supercomputer or other type of high-performance computer system, or more generally a "computer system," as that term is broadly utilized herein. The burst buffer appliance 102 is coupled between the computer system comprising compute nodes 104 and a parallel file system comprising first and second file systems 106-1 and 106-2, also referred to herein as File System 1 and File System 2, respectively. The parallel file system 106 is an example of what is more generally referred to herein as a "cluster file system." Numerous other types of computer systems and file systems may be used in other embodiments of the invention.

The burst buffer appliance 102 in the present embodiment is assumed to comprise a flash memory or other high-speed memory having a substantially lower access time than the file system 106. The burst buffer appliance 102 is further assumed to comprise an analytics engine, and may include other components.

Although flash memory will often be used for the high-speed memory of the burst buffer appliance 102, other types of low-latency memory could be used instead of flash memory. Typically, such low-latency memories comprise electronic memories, which may be implemented using non-volatile memories, volatile memories or combinations of non-volatile and volatile memories.

Portions of the high-speed memory of the burst buffer appliance are illustratively shown in FIG. 1 as respective storage locations for respective multiple data files denoted 1 through 12. Data files 1, 2, 3 and 4 are sent to the burst buffer appliance 102 from a processing element of the first compute node 104-1, also denoted Compute Node 1. The compute node processing element is shown as a large circle in the compute node. Similarly, data files 5, 6 and 7 are sent to the burst buffer appliance 102 from a processing element of the second compute node 104-2, also denoted Compute Node 2, and data files 8, 9, 10, 11 and 12 are sent to the burst buffer appliance 102 from a processing element of the M-th compute node 104-M, also denoted Compute Node M.

The burst buffer appliance 102 is configured to aggregate multiple data files having a size below a designated threshold into a container having at least one associated metadata file for processing by the analytics engine. The burst buffer appliance directs storage of the container in the file system 106.

By way of example, the analytics engine of the burst buffer appliance may be configured to generate at least a content-based portion of the one or more metadata files of the container based at least in part on content of one or more of the multiple data files so as to permit one or more subsequent processing operations to be performed using the metadata file(s) rather than the corresponding multiple data files.

In this embodiment, the burst buffer appliance 102 aggregates the multiple data files 1 through 12 received from compute nodes 104-1, 104-2 and 104-M into three different containers for storage in the parallel file system 106. More particularly, a container comprising the set of data files 8 through 12 received from compute node 104-M is stored in first file system 106-1. Separate containers comprising the set of data files 1 through 4 received from compute node 104-1 and the set of data files 5 through 7 received from compute node 104-2 are stored in the second file system 106-2.

It is assumed in this embodiment that each of the multiple data files aggregated into a given container has a size below a designated threshold. It is further assumed that each of the containers has at least one associated metadata file, although the metadata files are not expressly shown in the figure. Examples of metadata files will be described in greater detail below in conjunction with FIGS. 3 through 5.

The designated threshold below which data files are aggregated into a container by the burst buffer appliance 102 may vary depending upon the particular processing application as well as the type of analytics to be performed by the analytics engine. Numerous other implementation-specific factors may be taken into account in determining an appropriate size threshold. Also, multiple thresholds may be used for respective different types of data files, processing operations or analytics.

The burst buffer appliance 102 in the present embodiment illustratively implements a virtual layer of a parallel log-structured file system (PLFS), although as indicated previously other types of parallel file systems or more generally cluster file systems may be used in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein.

Although only a single burst buffer appliance 102 is associated with all of the compute nodes 104 in this embodiment, in other embodiments each compute node or each of other subsets of the compute nodes 104 may have a separate instance of the burst buffer appliance 102 associated therewith. Thus, in some embodiments, a given burst buffer appliance may be coupled between a single compute node and the parallel file system 106. The term "computer system" as broadly used herein should therefore also be understood to encompass an arrangement involving only a single compute node.

The burst buffer appliance 102 may receive data files from a variety of sources other than the compute nodes 104, although such other sources are not explicitly shown in the figure. For example, the burst buffer appliance may receive data files comprising sensor data received from sensor networks. It is to be appreciated that a wide variety of additional or alternative data sources may provide input data files to the burst buffer appliance 102 for aggregation into containers in other embodiments.

As mentioned above, the burst buffer appliance 102 comprises a flash memory or other high-speed memory that stores data that is to be delivered to the parallel file system 106 as well as data that has been retrieved from the parallel file system 106. The high-speed memory has a substantially lower access time for write and read operations directed thereto than write and read operations directed to the parallel file system 106. Thus, the burst buffer appliance 102 is configured to accelerate IO operations between the compute nodes 104 and the parallel file system 106 by storing associated data in its high-speed memory.

For example, the burst buffer appliance 102 in the present embodiment may be configured to enhance the IO throughput performance of the information processing system 100 by supporting fast checkpointing of one or more compute nodes 104. More particularly, one or more of the compute nodes 104 can write data files comprising checkpoint data to the burst buffer memory at very high speeds, and that checkpoint data is later written at a much slower rate from the flash memory to the parallel file system 106 using the above-described containers. This ensures that other operations of the one or more compute nodes 104 are not unduly delayed by the writing of checkpoint data while also allowing the system 100 to continue to utilize the parallel file system 106.

It is also possible that the burst buffer appliance 102 may include multiple virtual machines that facilitate prioritization of checkpoints as well as coordination of priorities for other types of IO operations that involve utilization of the high-speed memory of the burst buffer appliance. For example, different virtual machines of the burst buffer appliance may be used to process different types of data files, such as data files comprising checkpoint data and data files comprising sensor data. Such an arrangement permits different IO throughput performance levels to be provided for the different types of data files. The particular number of virtual machines implemented in the burst buffer appliance 102 may be varied, as well as the types of IO operations that are subject to virtual machine control.

Accordingly, the term "burst buffer appliance" as used herein is intended to be broadly construed, so as to encompass any network appliance or other arrangement of hardware and associated software or firmware that collectively provides a high-speed memory, an analytics engine and possibly one or more virtual machines that control access to the high-speed memory for distinct types of IO operations. Thus, such an appliance includes a high-speed memory that may be viewed as serving as a buffer between a computer system comprising compute nodes 104 and a file system such as parallel file system 106, for storing bursts of data associated with different types of IO operations.

The burst buffer appliance 102, compute nodes 104 and parallel file system 106 may communicate with one another over one or more networks such as, for example, a global computer network such as the Internet, a wide area network (WAN), a local area network (LAN), a satellite network, a telephone or cable network, a cellular network, a wireless network such as WiFi or WiMAX, or various portions or combinations of these and other types of communication networks.

At least portions of the burst buffer appliance 102, compute nodes 104 and parallel file system 106 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the compute nodes 104 and parallel file system 106, the burst buffer appliance 102 in other embodiments may be implemented at least in part within one or more of these system elements. It is also to be appreciated that a given embodiment of the information processing system 100 may include multiple instances of one or more of the burst buffer appliance 102, the set of M compute nodes 104 and the parallel file system 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary embodiment of an information processing system comprising multiple burst buffer appliances is shown in FIG. 2. In this embodiment, information processing system 200 comprises first and second burst buffer appliances 202-1 and 202-2 associated with respective first and second sets 205-1 and 205-2 of compute nodes 204. The compute nodes in set 205-1 include compute nodes designated 204-$x$ and the compute nodes in set 205-2 include compute nodes designated 204-$y$.

The first set of compute nodes 205-1 is coupled via the first burst buffer appliance 202-1 to an underlying file system 206, which may comprise a parallel file system implemented in accordance with PLFS. Similarly, the second set of compute nodes 205-2 is coupled via the second burst buffer appliance 202-2 to the underlying file system 206.

The burst buffer appliances 202 in this embodiment are also referred to as aBBa nodes. The first and second burst buffer appliances 202-1 and 202-2 incorporate respective visualization components 210-1 and 210-2, respective PLFS components 212-1 and 212-2, as well as additional processing components such as general purpose graphics processing units (GPGPUs) and storage components such as solid state device (SSD) drives. The visualization components 210 may be viewed as examples of what are more generally referred to herein as analytic engines. The SSD drives may implement at least a portion of the above-described high-speed memory of the burst buffer appliances 202.

As illustrated in the diagram, containers each comprising multiple aggregated data files and one or more metadata files are periodically drained from the high-speed memories of the respective burst buffer appliances 202 into the underlying file system 206.

The operation of the information processing system 100 of FIG. 1 will now be described in greater detail with reference to FIG. 3 through 5. The disclosed techniques can be extended in a straightforward manner to numerous other types and configurations of information processing system, such as the information processing system 200 of FIG. 2.

Figure 3A:
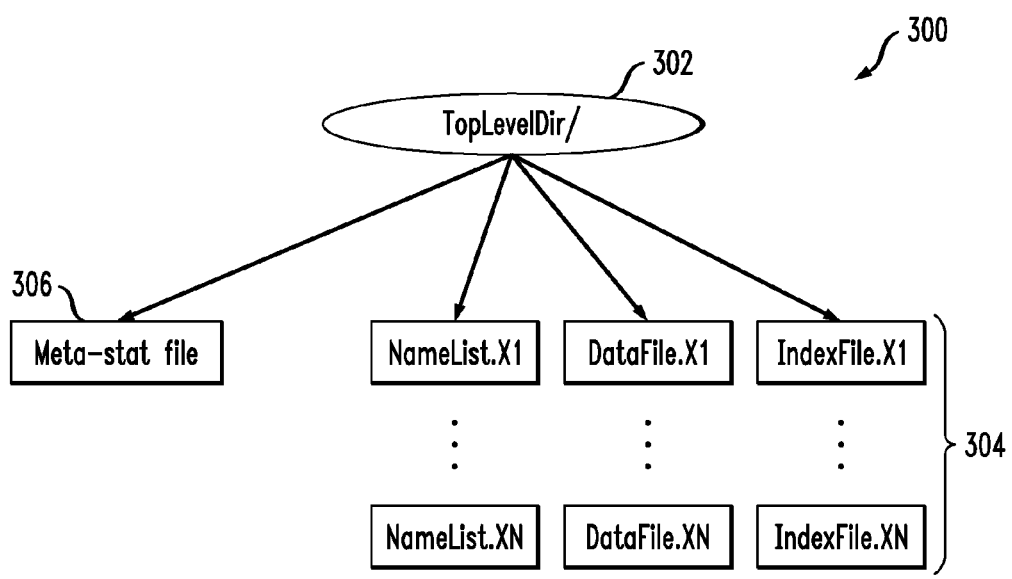
FIG. 3A shows an exemplary container structure for aggregating multiple small files.

Referring now to FIG. 3A, an exemplary container structure for aggregating multiple small files in the burst buffer appliance 102 is shown. As mentioned previously, the burst buffer appliance 102 is configured to aggregate multiple data files having a size below a designated threshold into a container having at least one associated metadata file for processing by the analytics engine.

The one or more metadata files in some embodiments are generated at least in part by the analytics engine of the burst buffer appliance 102. For example, the analytics engine may be configured to generate at least a content-based portion of the one or more metadata file of the container based at least in part on content of one or more of the multiple data files so as to permit one or more subsequent processing operations to be performed using the one or more metadata files rather than the corresponding multiple data files.

In the FIG. 3A example, a container 300 comprises a top-level directory 302 and N files collectively designated by reference numeral 304. The N files 304 more particularly comprise N data files denoted DataFile.X1 through DataFile.XN. Associated with these N data files are corresponding metadata files including respective name list files NameList.X1 through NameList.XN and respective index files IndexFile.X1 through IndexFile.XN. The container 300 further includes an additional metadata file 306 illustratively referred to in this embodiment as a meta-stat file.

The meta-stat file of FIG. 3 may be viewed as one possible example of the above-noted content-based portion of one or more metadata files associated with the data files DataFile.X1 through DataFile.XN. Thus, in the FIG. 3 embodiment, multiple data files are aggregated within the container 300 and have metadata files associated therewith, with the metadata files including at least one content-based portion. The "content-based portion" as that term is broadly used herein may comprise a particular individual metadata file or set of multiple metadata files, or at least a portion of one or more metadata files.

Figure 3B:
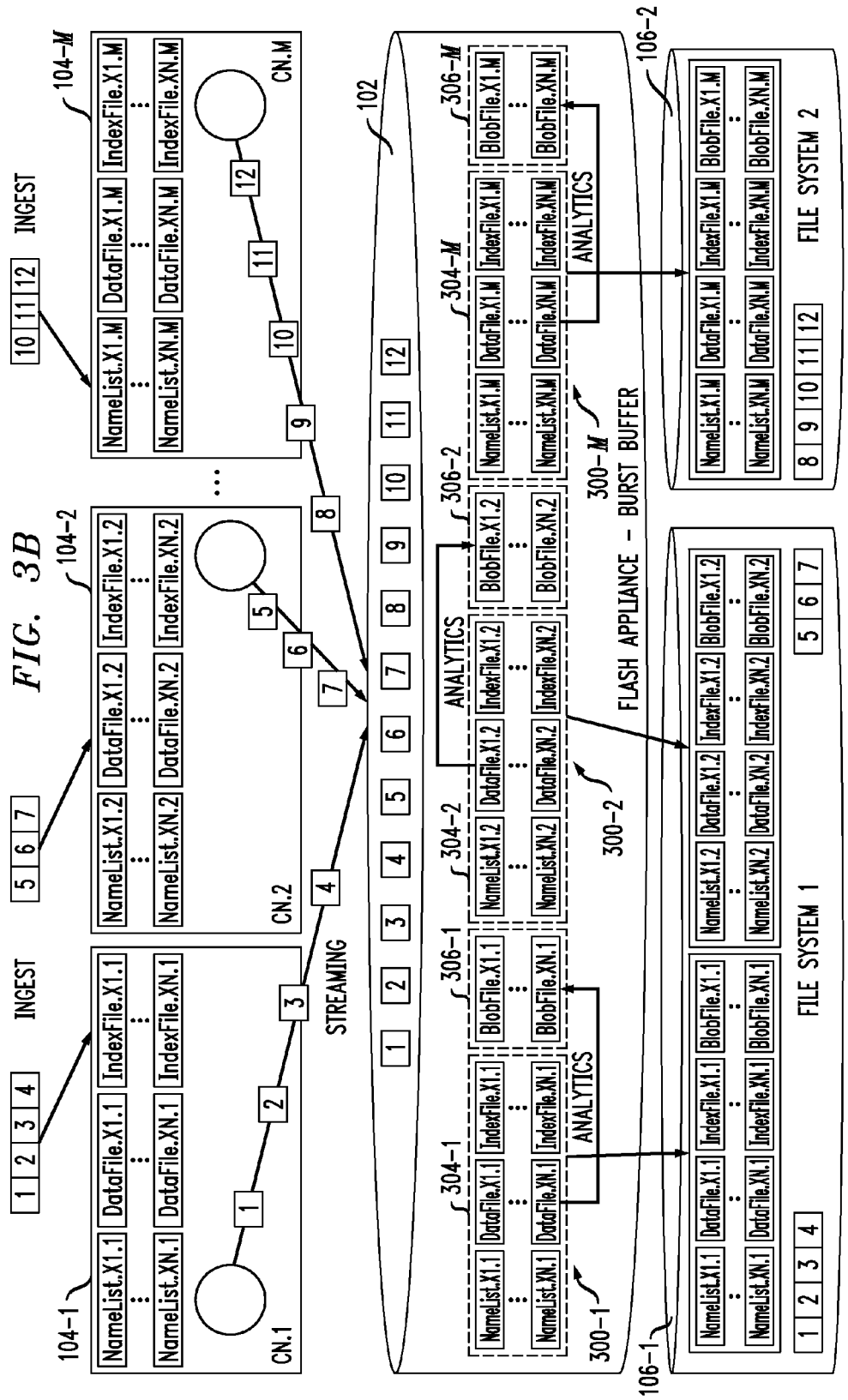
FIG. 3B illustrates the use of the container structure of FIG. 3A in performing analytics operations in the FIG. 1 system.

The meta-stat file 306 may more particularly comprise at least one blob file for each of the data files DataFile.X1 through DataFile.XN. Such an arrangement is illustrated in FIG. 3B, which shows the information processing system 100 comprising compute nodes 104, burst buffer appliance 102 and parallel file system 106, substantially as previously described. The burst buffer appliance 102 is also referred to as a flash appliance in an implementation in which the high-speed memory comprises a flash memory.

In this embodiment, compute nodes 104 ingest data files that are subsequently delivered by streaming via their respective processing elements to the burst buffer appliance 102. The data files each include associated metadata files including a name list file and an index file, arranged as previously described in FIG. 3A.

The name list, data and index files associated with compute node 104-1 are more particularly denoted NameList.X1.1-NameList.XN.1, DataFile.X1.1-DataFile.XN.1, and IndexFile.X1.1-IndexFile.XN.1, respectively.

Similarly, the name list, data and index files associated with compute node 104-2 are more particularly denoted NameList.X1.2-NameList.XN.2, DataFile.X1.2-DataFile.XN.2, and IndexFile.X1.2-IndexFile.XN.2, respectively, and the name list, data and index files associated with compute node 104-M are more particularly denoted NameList.XLM-NameList.XN.M, DataFile.X1.M-DataFile.XN.M, and IndexFile.X1.M-IndexFile.XN.M, respectively. As indicated previously, the name list and index files are considered metadata files that correspond to respective ones of the data files.

The above-described name list, data and index files are streamed from the corresponding compute nodes 104 to the burst buffer appliance 102 as indicated. In the burst buffer appliance, these files are aggregated into respective containers 300-1, 300-2 and 300-M. The containers 300-1, 300-2 and 300-M comprise respective first portions 304-1, 304-2 and 304-M, each generally having the configuration of the file set 304 of FIG. 3A, and respective content-based portions 306-1, 306-2 and 306-M. The content-based portions 306-1, 306-2 and 306-M in this embodiment comprise respective sets of content-based metadata files also referred to as blob files. More particularly, the content-based portions 306-1, 306-2 and 306-M comprise respective sets of blob files denoted BlobFile.X1.1-BlobFile.XN.1, BlobFile.X1.2-BlobFile.XN.2, and BlobFile.X1.M-BlobFile.XN.M.

The additional content-based portions 306-1, 306-2 and 306-M are generated in this embodiment by an analytics engine of the burst buffer appliance 102. More particularly, the analytics engine in this embodiment performs analytics on the aggregated name list, data and index files of each container 300 in order to generate the corresponding set of blob files that are also included in that container. This analytics processing is indicated generally by the arrows between first portions 304-1, 304-2 and 304-M and respective second portions 306-1, 306-2 and 306-M in the figure.

The containers 300 including their respective content-based portions 306 are stored by the burst buffer appliance 102 in the parallel file system 106 comprising first and second files systems 106-1 and 106-2, also denoted in the figure as File System 1 and File System 2, respectively. It should be noted that the files are stored in a different arrangement than that previously described in conjunction with FIG. 1. More particularly, in this embodiment, the containers 300-1 and 300-2, which contain respective sets of aggregated files streamed from respective compute nodes 104-1 and 104-2 and the associated content-based metadata files 306-1 and 306-2 as generated by the analytics engine of the burst buffer appliance, are stored in File System 1. The container 300-M, which contains the set of aggregated files streamed from compute node 104-M and the associated content-based metadata files 306-M as generated by the analytics engine, are stored in File System 2.

Examples of particular types of analytics that may be applied by an analytics engine to generate the content-based portion 306 of one or more metadata files of a given container 300 will now be described with reference to FIGS. 4 and 5.

FIG. 4 shows system 100 substantially as previously described in conjunction with FIG. 3B but including a burst buffer appliance 102' having an analytics engine 400 configured to perform virus checking on the data files received from the first compute node 104-1. The analytics engine 400 checks each of the data files DataFile.X1.1-DataFile.XN.1 of a corresponding container within the burst buffer appliance 102', and in this example determines that one of these data files, namely DataFile.X1.2, is infected with a virus.

The content-based metadata files generated by the analytics engine 400 using the name list, data and offset files in this example include, in place of one of the blob files previously described in conjunction with FIG. 3B, a clean version CleanFile.X1.2 of the infected data file DataFile.X1.2.

Accordingly, in the FIG. 4 example, the content-based portion of the metadata files identifies a particular one of the multiple data files DataFile.X1.1-DataFile.XN.1 that is determined to be infected with a virus using a virus checking operation performed by the analytics engine 400.

A corresponding container in which the infected data file DataFile.X1.2 is replaced by the clean version CleanFile.X1.2 is stored in File System 2 as indicated, and a related container with virus check indicators is stored in File System 1.

Arrangements of the type illustrated in FIG. 4 advantageously allow security threat and quarantine information to be added to the container in which the multiple data files are aggregated. As a result, data files that are infected with viruses can be identified as such within the container metadata such that infected files will not be inadvertently opened. This helps to prevent the spread of viruses within the system, and avoids the need for repeated scanning of large numbers of small files.

In other embodiments, the content-based portion of the one or more metadata files may identify one or more results of a map reduce operation performed on the multiple data files by the analytics engine.

Figure 5:
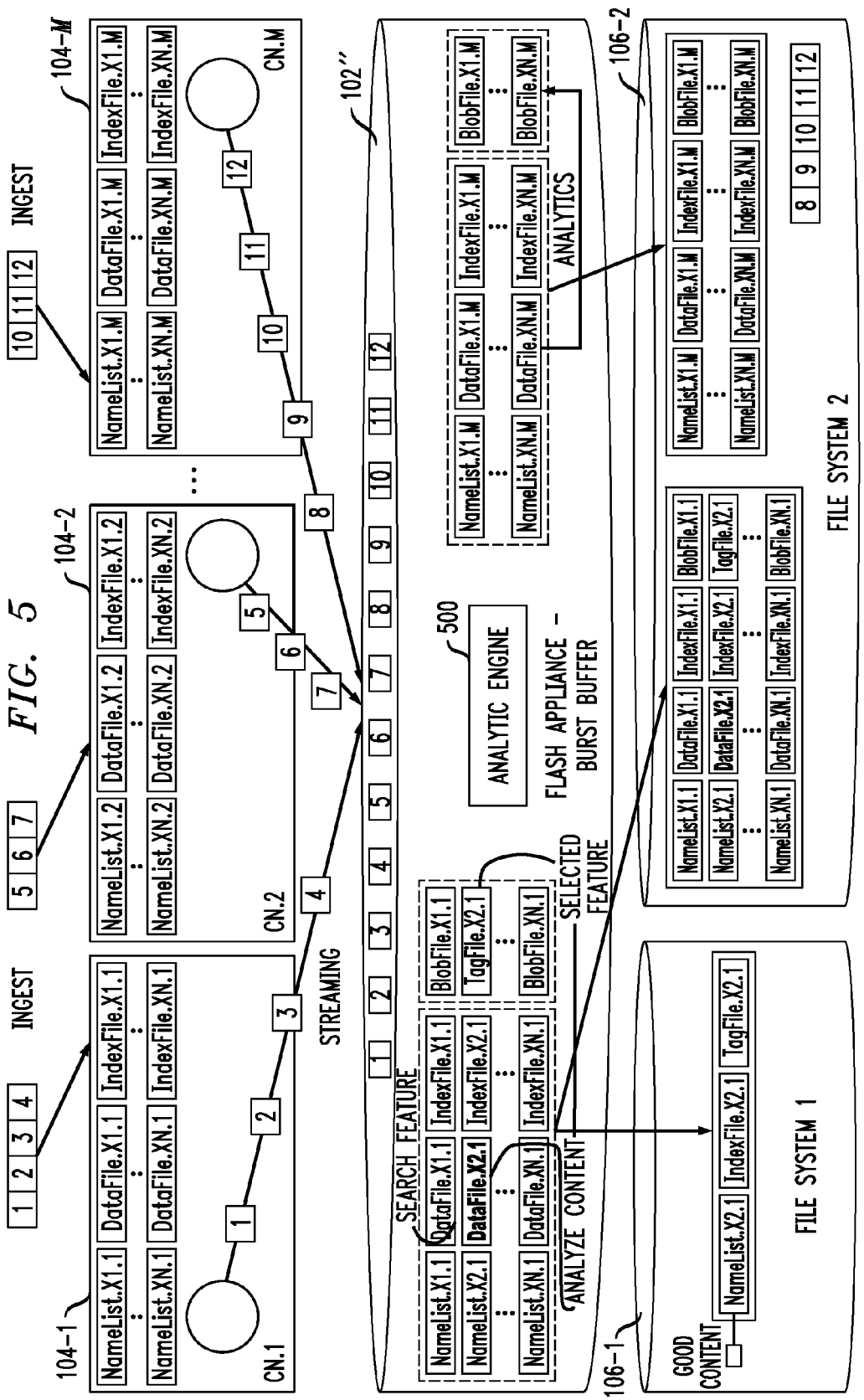

An example of an embodiment of this type is shown in FIG. 5. In this embodiment, system 100 is configured substantially as previously described in conjunction with FIG. 3B but includes a burst buffer appliance 102" having an analytics engine 500 configured to perform at least one map reduce operation on the data files received from the first compute node 104-1. The map reduce operation in this example involves analyzing the content of the multiple data files aggregated into a container to determine which if any of these data files includes a certain selected feature. The analytics engine 500 applies the map reduce operation to the data files DataFile.X1.1-DataFile.XN.1 of a corresponding container within the burst buffer appliance 102", and in this example identifies as a result of the map reduce operation a particular one of these data files, namely DataFile.X1.2, that has the selected feature.

The content-based metadata files generated by the analytics engine 500 using the name list, data and offset files in this example include, in place of one of the blob files previously described in conjunction with FIG. 3B, a tag file TagFile.X1.2 indicating that the corresponding data file DataFile.X1.2 has the selected feature.

Accordingly, in the FIG. 5 example, the content-based portion of the metadata files identifies a particular one of the multiple data files DataFile.X1.1-DataFile.XN.1 that is determined to have a selected feature as a result of a map reduce operation performed by the analytics engine 500.

A corresponding container in which the blob file BlobFile.X1.2 is replaced by the tag file TagFile.X1.2 is stored in File System 2 as indicated, and a related container having a feature indicator is stored in File System 1.

Arrangements of the type illustrated in FIG. 5 advantageously allow subsequent map reduce operations to be performed on the container using only its metadata, thereby avoiding the need to read large numbers of small files.

Numerous other types of analytics may be applied in a burst buffer appliance in other embodiments. For example, an analytics engine may be configured to determine keys of a particular key-value store that are associated with the multiple data files of the container and to update the content-based portion of the one or more metadata files of the container to identify one or more of the keys.

The above-described embodiments allow data files below a certain threshold size to be aggregated into a container that can be periodically flushed to the underlying file system. These embodiments extend metadata such as name list and offset metadata associated with the aggregated data files to include content-based portions which may comprise one or more additional content-based metadata files. These content-based metadata portions are generated in a particularly efficient and flexible manner using an analytics engine of a burst buffer appliance. As a result, increased processing efficiency is provided for small data files that could otherwise significantly undermine the IO throughput performance of the system.

The particular processing operations and other system functionality described in conjunction with FIGS. 1 through 5 are presented by way of illustrative example only, and should not be construed as limiting the scope of the invention in any way. Alternative embodiments can use other types and arrangements of burst buffer appliances, computer systems and file systems.

It is to be appreciated that functionality such as that described in conjunction with FIGS. 1 through 5 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

It was noted above that portions of the information processing system 100 may be implemented using one or more processing platforms. Illustrative embodiments of such platforms will now be described in greater detail.

Figure 6:
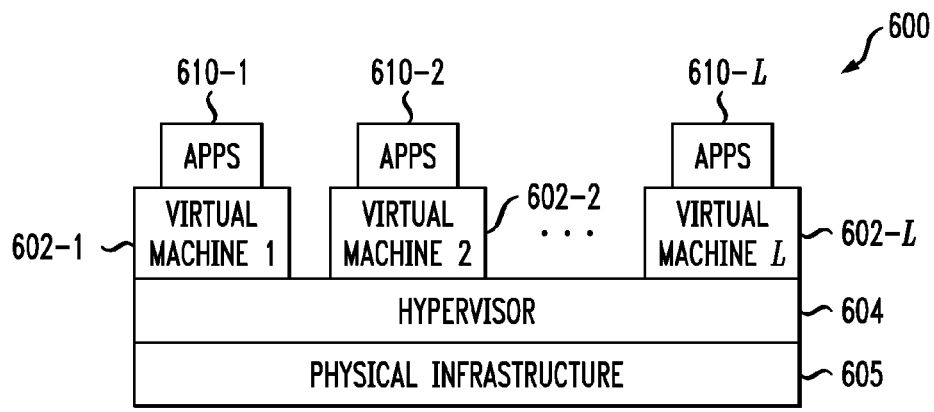
FIGS. 6 and 7 show examples of processing platforms that may be utilized to implement at least a portion of the information processing systems of FIGS. 1 and 2.
Figure 7:
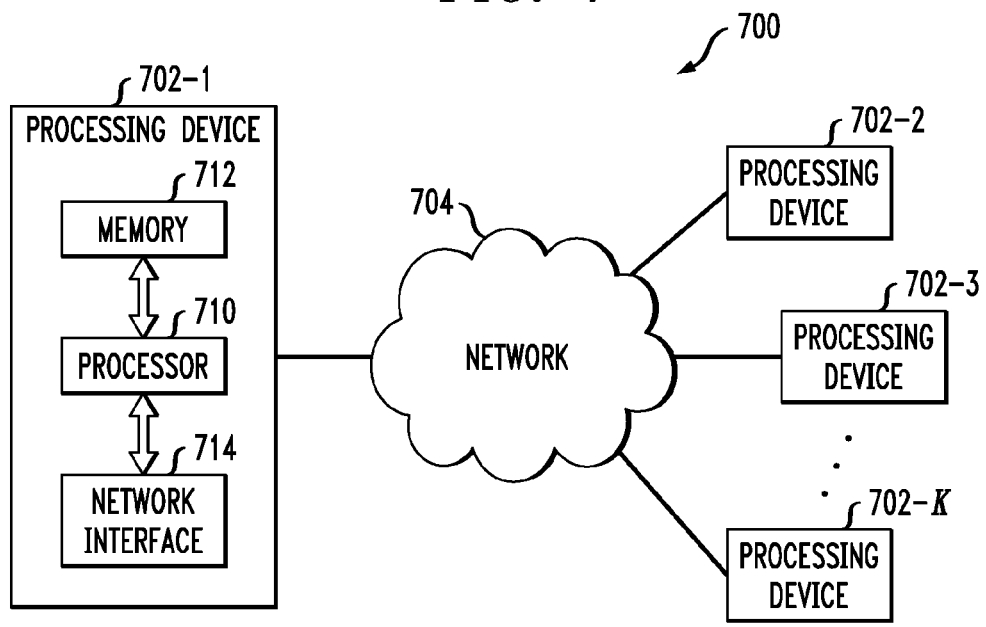

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of the burst buffer appliance 102.

An example of a commercially available hypervisor platform that may be used to implement hypervisor 604 and possibly other portions of the information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read-only memory (ROM) or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a burst buffer appliance as disclosed herein can be implemented at least in part in the form of one or more software programs stored in memory and executed by a processor of a processing device such as one of the virtual machines 602 or one of the processing devices 702. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, the disclosed techniques are applicable to a wide variety of other types of information processing systems, computer systems and file systems that can benefit from increased analytics efficiency using one or more burst buffer appliances as described herein. Also, the particular configurations of system and device elements shown in FIGS. 1 through 7 can be varied in other embodiments. Thus, for example, the number of burst buffer appliances deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a burst buffer appliance adapted for coupling between a computer system and a file system;
the burst buffer appliance comprising:
a high-speed memory having a substantially lower access time than the file system; and
an analytics engine;
the burst buffer appliance being configured to aggregate multiple data files having a size below a designated threshold into a container having at least one associated metadata file for processing by the analytics engine;
wherein the burst buffer appliance directs storage of the container in the file system;
wherein the analytics engine is configured to generate at least a content-based portion of the one or more metadata files of the container based at least in part on content of one or more of the multiple data files so as to permit one or more subsequent processing operations to be performed using the one or more metadata files rather than the corresponding multiple data files.

2. The apparatus of claim 1 wherein the analytics engine is configured to perform a virus checking operation on the multiple data files of the container and to update the content-based portion of the one or more metadata files of the container to identify one or more of the multiple data files that are determined to be infected with a virus.

3. The apparatus of claim 1 wherein the analytics engine is configured to perform a map reduce operation on the multiple data files of the container and to update the content-based portion of the one or more metadata files of the container to identify one or more results of the map reduce operation.

4. The apparatus of claim 1 wherein the analytics engine is configured to determine keys associated with the multiple data files of the container and to update the content-based portion of the one or more metadata files of the container to identify one or more of the keys.

5. The apparatus of claim 1 wherein a given one of the one or more metadata files comprises for each of the multiple data files corresponding name list and index files.

6. The apparatus of claim 1 wherein the computer system comprises a plurality of compute nodes and the burst buffer appliance is adapted for coupling between the compute nodes and the file system.

7. The apparatus of claim 1 wherein the file system comprises a parallel log-structured file system.

8. The apparatus of claim 7 wherein the burst buffer appliance implements a virtual layer of the parallel log-structured file system.

9. The apparatus of claim 1 wherein the high-speed memory comprises a flash memory.

10. A processing platform that incorporates the apparatus of claim 1.

11. A method comprising:
configuring a burst buffer appliance adapted for coupling between a computer system and a file system to include a high-speed memory having a substantially lower access time than the file system; and
aggregating in the burst buffer appliance multiple files having a size below a designated threshold into a container having at least one associated metadata file;
processing the container in an analytics engine of the burst buffer appliance; and
storing the container in the file system;
wherein processing the container in the analytics engine comprises generating at least a content-based portion of the one or more metadata files of the container based at least in part on content of one or more of the multiple data files so as to permit one or more subsequent processing operations to be performed using the one or more metadata files rather than the corresponding multiple data files.

12. The apparatus of claim 11 wherein processing the container in the analytics engine comprises:
performing a virus checking operation on the multiple data files of the container; and
updating the content-based portion of the one or more metadata files of the container to identify one or more of the multiple data files that are determined to be infected with a virus.

13. The apparatus of claim 11 wherein processing the container in the analytics engine comprises:
performing a map reduce operation on the multiple data files of the container; and
updating the content-based portion of the one or more metadata files of the container to identify one or more results of the map reduce operation.

14. The apparatus of claim 11 wherein processing the container in the analytics engine comprises:
determining keys associated with the multiple data files of the container; and
updating the content-based portion of the one or more metadata files of the container to identify one or more of the keys.

15. A computer program product comprising a processor-readable storage medium having encoded therein executable code of one or more software programs, wherein the one or more software programs when executed in at least one processing device cause the processing device to perform the method of claim 11.

16. An information processing system comprising:
a computer system;
a file system; and
a burst buffer appliance coupled between the computer system and the file system, the burst buffer appliance comprising:
a high-speed memory having a substantially lower access time than the file system; and
an analytics engine;
the burst buffer appliance being configured to aggregate multiple files having a size below a designated threshold into a container having at least one associated metadata file for processing by the analytics engine;

wherein the burst buffer appliance directs storage of the container in the file system;

wherein the analytics engine is configured to generate at least a content-based portion of the one or more metadata files of the container based at least in part on content of one or more of the multiple data files so as to permit one or more subsequent processing operations to be performed using the one or more metadata files rather than the corresponding multiple data files.

17. The system of claim 16 wherein the computer system comprises a plurality of compute nodes and the burst buffer appliance is coupled between the compute nodes and the file system.

18. The system of claim 16 wherein the file system comprises a parallel log-structured file system.

\* \* \* \* \*

UNITED STATES PATENT AND TRADEMARK OFFICE
CERTIFICATE OF CORRECTION

PATENT NO. : 8,972,465 B1
APPLICATION NO. : 13/840274
DATED : March 3, 2015
INVENTOR(S) : Sorin Faibish et al.

It is certified that error appears in the above-identified patent and that said Letters Patent is hereby corrected as shown below:

In the specification:

Column 6, line 33, after "one or more metadata" please change "file" to --files--

Column 7, line 46, please change "306-Min" to --306-M in--

Column 8, line 9, please change "DataFile.X1.2" to --DataFile.X2.1--

Column 8, line 14, before "of the infected data file" please change "X1.2" to --X2.1--

Column 8, line 14, after "of the infected data file" please change "DataFile.X1.2" to --DataFile.X2.1--

Column 8, line 21, please change "DataFile.X1.2" to --DataFile.X2.1--

Column 8, line 22, before "is stored in File System 2" please change "X1.2" to --X2.1--

Column 8, line 51, please change "DataFile.X1.2" to --DataFile.X2.1--

Column 8, line 56, please change "TagFile.X1.2" to --TagFile.X2.1--

Column 8, line 57, please change "DataFile.X1.2" to --DataFile.X2.1--

Column 8, line 65, before "Is replaced by" please change "X1.2" to --X2.1--

Column 8, line 65, after "the tag file" please change "TagFile.X1.2" to --TagFile.X2.1--

In the claims:

Claim 1, column 11, line 37, after "container in the file system;" please insert --and--

Claim 12, column 12, line 29, please change "apparatus" to --method--

Claim 13, column 12, line 37, please change "apparatus" to --method--

Claim 14, column 12, line 44, please change "apparatus" to --method--

Claim 16, column 13, line 4, after "container in the file system," please insert --and--

Signed and Sealed this
Seventh Day of July, 2015

Michelle K. Lee
*Director of the United States Patent and Trademark Office*